(12) United States Patent  (10) Patent No.: US 8,438,748 B1
Moon  (45) Date of Patent: *May 14, 2013

(54) CALIPER MOUNTING ACCESSORIES

(75) Inventor: Charles W. Moon, Colorado Springs, CO (US)

(73) Assignee: MAG-ORO, Inc., Monument, CO (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/116,953

(22) Filed: May 26, 2011

Related U.S. Application Data

(63) Continuation-in-part of application No. 12/726,225, filed on Mar. 17, 2010, now abandoned, which is a continuation-in-part of application No. 12/130,226, filed on May 30, 2008, now Pat. No. 7,735,237.

(60) Provisional application No. 61/351,357, filed on Jun. 4, 2010.

(51) Int. Cl.
*G01B 5/02* (2006.01)
(52) U.S. Cl.
USPC .................................................. 33/783
(58) Field of Classification Search ............ 33/783, 33/784, 792, 793, 794, 795, 806, DIG. 1, 33/572
See application file for complete search history.

(56) References Cited

U.S. PATENT DOCUMENTS

| | | | |
|---|---|---|---|
| 4,291,465 A * | 9/1981 | Hemeyer | 33/795 |
| 4,608,759 A * | 9/1986 | Bowhay | 33/796 |
| 4,731,931 A * | 3/1988 | Goodman et al. | 33/796 |
| 4,741,108 A * | 5/1988 | Cohen | 33/783 |
| 5,313,715 A * | 5/1994 | Wang | 33/810 |
| 6,009,633 A * | 1/2000 | Novak | 33/833 |
| 7,245,199 B1 * | 7/2007 | Reilly | 33/640 |
| 7,735,237 B1 * | 6/2010 | Moon | 33/783 |
| 8,261,464 B2 * | 9/2012 | Wisen | 33/706 |
| 2003/0051361 A1 * | 3/2003 | Economaki | 33/534 |

OTHER PUBLICATIONS

Eagle America, "Intro Special: Digi Align," found at the Internet Wayback Machine (http://web.archive.org), dated May 24, 2009, 1 page.
Igaging, "iGaging Digi Align—Digital Alignment System," found at http://www.igaging.com/page910.html, dated May 26, 2011 (earliest publication date unknown), 2 pages.
Igaging, "iGaging Woodworking Digital Scales and Readouts," found at http://www.igaging.com/page97.html, dated May 26, 2011 (earliest publication date unknown), 1 page.
Igaging, "DigiMAG Remote Readout Operating and Assembly Manual," found at http://eacmedia.net/manuals/IGAGING/424-0160.pdf on May 26, 2011 (earliest publication date unknown), 1 page.

(Continued)

*Primary Examiner* — Christopher Fulton
(74) *Attorney, Agent, or Firm* — Eric W. Cernyar, P.C.

(57) ABSTRACT

Caliper mounts are provided that include a shallow channel for receiving a caliper scale bar, a retainer with a stepped cone washer positioned adjacent one side wall of the channel, and one or more shelves cantilevered over an opposite side wall of the channel. The shelves and retainer cooperate to retain the scale bar of a conventional sliding caliper in the channel. One caliper mount is formed as a rectangular miter slot base configured for insertion into the miter slot of a saw or router table. Another caliper mount is formed as cylindrical housing that incorporates a permanent disc magnet. Container shells and molded platforms adapted to mount a sliding caliper perpendicular to an elongated miter slot are also provided.

20 Claims, 14 Drawing Sheets

OTHER PUBLICATIONS

Edward J. Bennett Company, "TS-Aligner," found at http://www.ts-aligner.com/, PDF properties date of Apr. 24, 1999, 6 pages.

Edward J. Bennett Company, "TS-Aligner Jr," found at http://www.ts-aligner.com/, PDF properties date of Oct. 12, 2005, 2 pages.

Edward J. Bennett Company, "TS-Aligner Jr. Lite Owner's Manual," found at http://www.ts-aligner.com/, PDF properties date of Oct. 16, 1999, 37 pages.

* cited by examiner

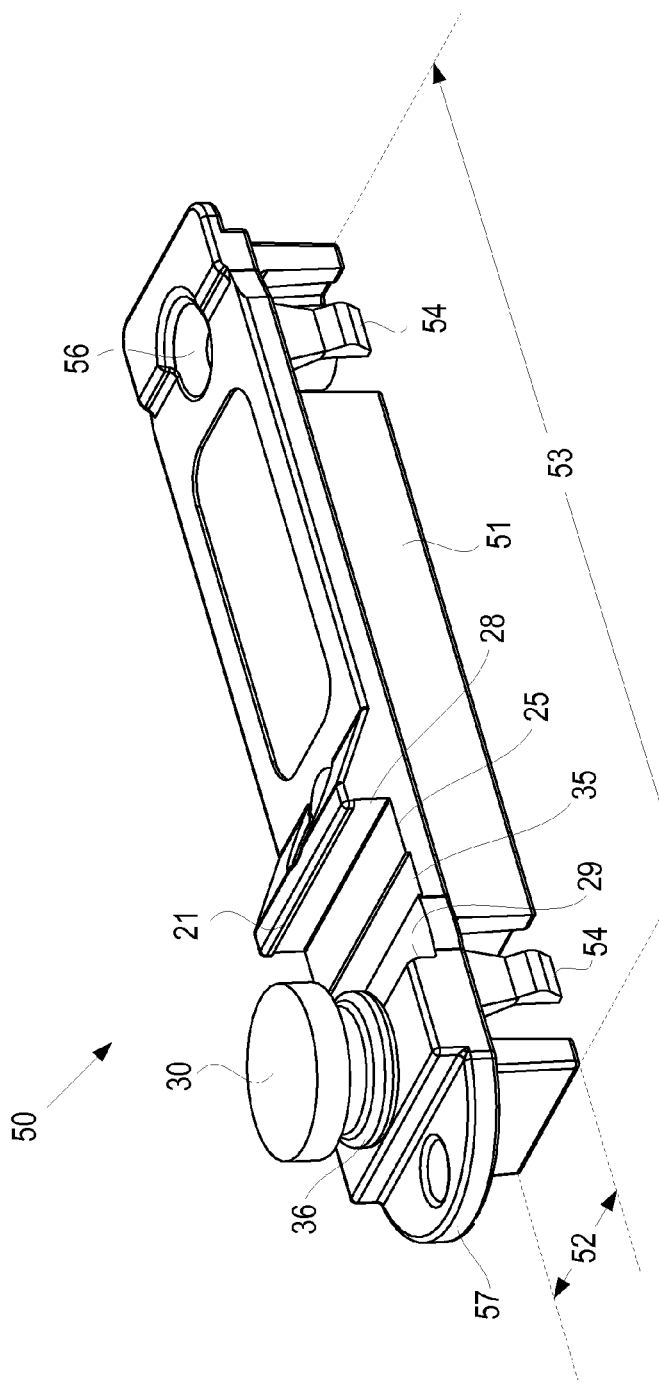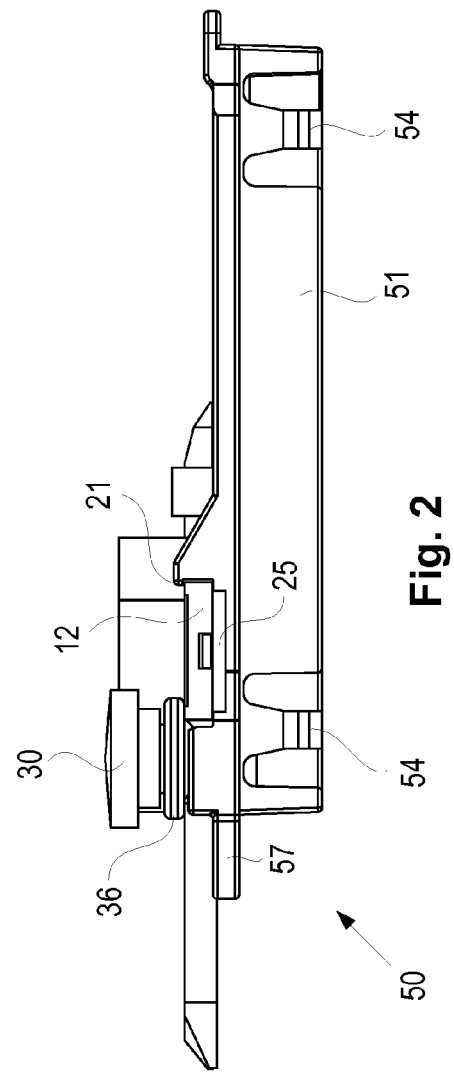

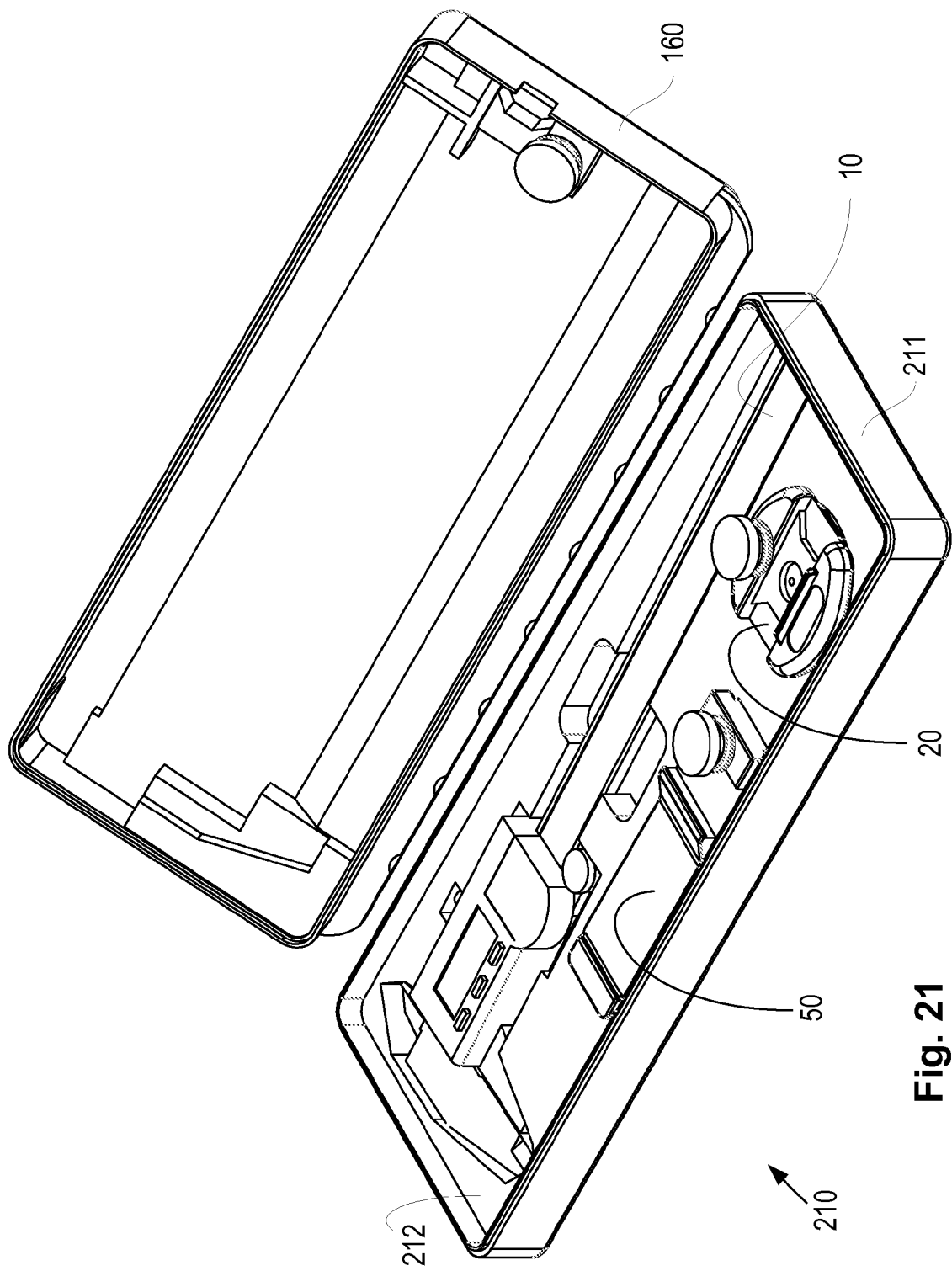

CALIPER MOUNTING ACCESSORIES

RELATED APPLICATIONS

This application claims priority to my U.S. provisional patent application No. 61/351,357, filed Jun. 4, 2010, for "Caliper Kits, Cases, and Mounting Accessories." This application is also a continuation-in-part of my U.S. patent application Ser. No. 12/726,225, filed Mar. 17, 2010, for a "Digital Measurement Device," now abandoned, which is a continuation-in-part of U.S. Pat. No. 7,735,237, issued on Jun. 15, 2010, entitled "Versatile Caliper Mounting and Measurement Accessory." This application hereby incorporates by reference the aforementioned patent applications and patent.

FIELD OF THE INVENTION

This invention relates generally to linear measurement devices, and more specifically, to digital measurement devices for machine tools.

BACKGROUND OF THE INVENTION

Sliding calipers are handheld tools used to very precisely measure the distance between two symmetrically opposing sides. They are frequently used in checking or inspecting dimensions of parts and/or assemblies in metal, plastic, and woodworking fields. Conventional handheld sliding calipers are relatively inexpensive, but they are not suitable for many applications, such as alignment of a saw blade or the positioning of a table saw fence, a milling machine travel table or spindle, or a metal lathe carriage, top slide, or tailstock. Stated another way, conventional handheld sliding calipers are generally not suitable as a generic machine positioning device.

Typically, precise movements of machining tools such as table saw fences, milling machine tables, and metal lathe carriages are made by recording the relative positions noted by crude markings adjacent to a hand wheel or hand crank on the machine. Alternatively, precise single-application devices, designed specifically for a table saw, milling machine, or metal lathe and typically costing hundreds of dollars, can be obtained and installed on these machines (or in some cases are purchased with the machine).

There is a need for inexpensive accessories to adapt a conventional handheld sliding caliper for use in making precise measurements on a wide variety of wood, metal, and plastic-working machines.

SUMMARY

Various embodiments of a mounting apparatus for a conventional sliding caliper are provided. One embodiment of a caliper mounting apparatus is provided in the form of a rectangular miter slot base configured to be inserted into the miter slot of a saw or router table. Another embodiment of a caliper mounting apparatus is provided in the form of a cylindrical housing that incorporates a permanent disc magnet. In both embodiments, the caliper mounting apparatus provides a shallow channel, approximately 0.67 inches wide, for receiving the scale bar of the caliper. A retainer comprising, for example, a thumb screw and cooperating plastic or elastomeric stepped cone washer, is positioned adjacent one side wall of the channel. One or more shelves are cantilevered over the opposite side wall of the channel. The shelves cooperate with the retainer to retain the caliper scale bar in the channel.

To mount a conventional sliding caliper, the retainer is loosened 1 to 1½ turns. The caliper scale bar is slid in, at an angle, underneath the washer. Next, the scale bar is lowered into contact with the base of the channel. Then, the scale bar is slid underneath the cantilevered shelf or shelves. The retainer is then tightened, causing an angled section of a stepped cone washer to bias the scale bar toward the shelf side of the channel. With the angled section of the stepped cone washer biasing the scale bar toward the shelf side of the channel, the channel has an effective width of approximately five-eighths of an inch.

The rectangular miter slot base embodiment includes a slot insertion section approximately three-quarters of an inch wide with resilient compression projections or spring fingers positioned along at least one long side of the slot insertion section. This configuration adapts the miter slot base for a snug insertion fit into an elongated slot of a saw or router table.

Various embodiments of container shells and molded platforms for a sliding caliper are also provided. The container shells and platforms are adapted to mount a conventional sliding caliper perpendicular to an elongated miter slot of a saw or router table. The container shells and platforms have a length dimension exceeding a length of the scale bar and a width dimension exceeding a width of the sliding caliper. This configuration helps to protect the sliding caliper from potentially damaging collisions with tools, workpieces, and equipment. In the container shell embodiments, the container shells are configured to mate with a cooperating container shell to house and store a standard caliper. The container shells are also suitable as stand-alone platforms for mounting a sliding caliper to a miter slot.

A caliper mount and caliper jaw rest are provided near opposite short sides of the container shells and platforms to secure the sliding caliper. The caliper mount comprises a truncated channel for receiving and securing an end of the caliper scale bar, a retainer adapted to releasably secure the end of the caliper scale bar within the truncated channel, and an opening to allow a depth probe to telescope between extended and retracted positions when the caliper scale bar is secured to the caliper mount. The caliper mount secures the scale bar in fixed relation to the container shell or platform. The container shells and platforms are also configured to allow free movement of the readout frame along the scale bar while the sliding caliper is secured to the container shell or platform.

Various embodiments of a table slot base are provided for mounting the container shell or platform to the miter slot. The table slot base comprises a slot insertion section approximately three-quarters of an inch wide with spring fingers or other resilient compression projections adapted for a snug insertion fit of the base into the elongated slot. The table slot mount is also oriented to anchor the long side of the container perpendicular to the table slot mount.

In one embodiment, the table slot base is integrally formed in the molded housing forming the container shell or platform. In three other embodiments, a table slot base is provided as a separable accessory to the container shell or platform.

In two embodiments, a plurality of table slot base connectors or receptacles, spaced approximately one inch apart relative to a long side of the container or platform, are provided to secure the table slot base to the container shell or platform at a selectable location along the long side of the container shell or platform. In one embodiment, the table slot mount comprises Lego®-like connectors molded to mount the table slot base, via a compression fit, to the container shell or platform mold. In another embodiment, the table slot base comprises a shallow channel and retainer adapted to mount onto a container shell flange configured like a caliper scale bar. In this latter embodiment, the table slot mount is adapted to mount not only the container shell to an elongated miter slot, but also a sliding caliper (without the container shell) to the elongated slot.

In yet another embodiment, a platform includes parallel slots along the long sides of the platform. A miter slot base may be secured to the platform at any desired position along the length of the slots by inserting thumb screws through the slots, screwing them into holes of the miter slot base, and tightening.

A caliper kit is also provided. The kit comprises a container housing, a sliding caliper, a miter slot base, and a magnetic caliper mounting apparatus. The container housing defines an interior section adapted to receive and protect the sliding caliper within the interior section. The kit includes a table slot mount incorporated into or attachable to the cover shell for mounting the cover shell to a miter slot.

BRIEF DESCRIPTION OF THE DRAWINGS

FIG. 1 is a perspective view of one embodiment of a caliper mounting apparatus in the form of a miter slot base.

FIG. 2 is a side view of the caliper mounting apparatus of FIG. 1, with a standard caliper mounted therein.

FIG. 21 is a perspective view of a sliding caliper kit including a container with a bottom shell, a removable cover, and a bay for holding a sliding caliper, a miter slot base, and a magnetic caliper mounting apparatus.

DESCRIPTION OF THE INVENTION

Figure 3:
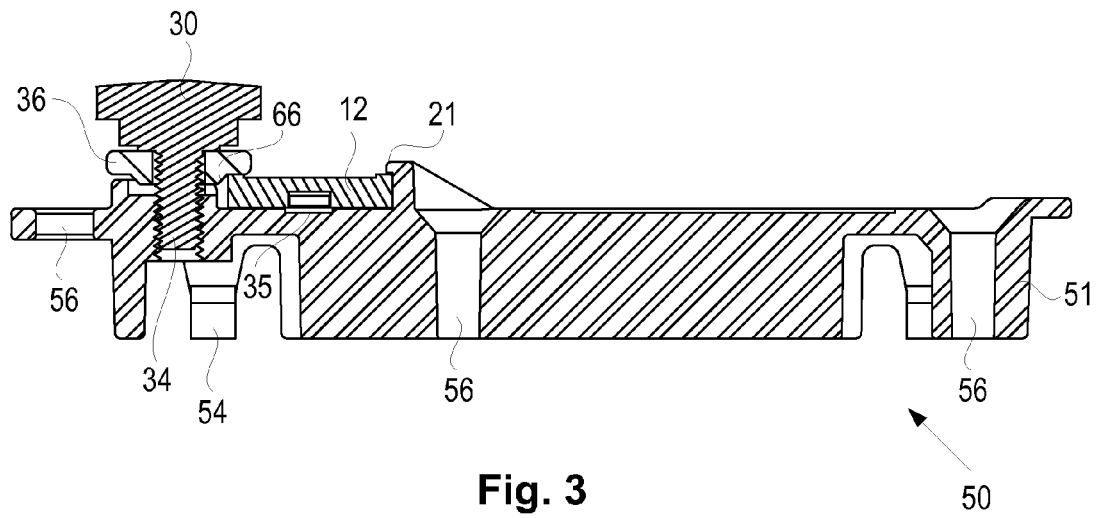
FIG. 3 is a cross-sectional view of the caliper mounting apparatus of FIG. 2.

In describing preferred and alternate embodiments of the technology described herein, as illustrated in the accompanying figures, specific terminology is employed for the sake of clarity. The technology described herein, however, is not intended to be limited to the specific terminology so selected, and it is to be understood that each specific element includes all technical equivalents that operate in a similar manner to accomplish similar functions.

FIGS. 4, 9, 12, 14, 16, and 20 display a conventional sliding caliper 10 mounted in various embodiments of caliper mounting accessories and containers. The caliper 10 comprises a scale bar 12, movable frame 13, depth probe 14, fixed outside jaw 15, movable outside jaw 16, fixed inside jaw 17, and movable inside jaw 18. Movable outside jaw 16 and movable inside jaw 18 are rigidly connected to the movable frame 13. Depth probe 14 is also coupled to and moves synchronously with the movable frame 13. A typical digital caliper has a resolution and accuracy of approximately 1 thousandth of an inch (~25 micrometers) or better. Other conventional calipers include dial calipers vernier calipers that incorporate a dial or vernier scale rather than (or in addition to) the digital readout 19.

Most conventional sliding calipers 10 share some common dimensions. The scale bar 12 typically has a width of about five-eighths of an inch, and a thickness of about ⅛ of an inch. The depth probe 14 is recessed within a bottom-side slot of the scale bar 12 and telescopes between retracted and extended positions.

Most saw tables and some router tables have one or more longitudinal miter slots or grooves, approximately three-eighths of an inch deep by three-quarters of an inch wide, located parallel to the blade. Miter slots are commonly used to position and guide a miter gauge or a crosscut sled.

FIGS. 1-4 depict one embodiment of a caliper mounting apparatus, in the form of a miter slot base or table slot base 50, configured to be inserted into the miter slot of a saw table or router table and mount a conventional sliding caliper 10. The miter slot base 50 comprises a rectangular block or slot insertion section 51 with a width dimension 52 of approximately three-quarters inch and a length dimension 53 of approximately 3½ inches. The width 52 is dimensioned so that the miter slot base 50 can be inserted into a standard miter slot. A pair of resilient compression projections or spring fingers 54 is provided along one or both long sides of the rectangular block 51 to hold the block 51 within the miter slot. Vertical fastener through-holes 56 are also provided through the rectangular block 51 and a shelf 57 so that the miter slot base 50 can be secured to other surfaces with screws 59 or other fasteners.

FIGS. 5-10 depict an embodiment of a magnetic caliper mounting apparatus 20 configured to mount a conventional sliding caliper 10 parallel to a flat metal surface. The magnetic caliper mounting apparatus 20 comprises a permanent disc magnet 22, a caliper mount 24 taking the form of a molded cylindrical plastic housing, and a retainer 30 adapted to releasably secure a caliper's scale bar 12 within a channel of the caliper mount 24. The magnet 22 has a flat exposed surface 38 for securing the apparatus 20 to a metal surface without a clamp or screw. A bolt or rivet 39 secures the caliper mount 24 to the magnet 22.

Figure 4:
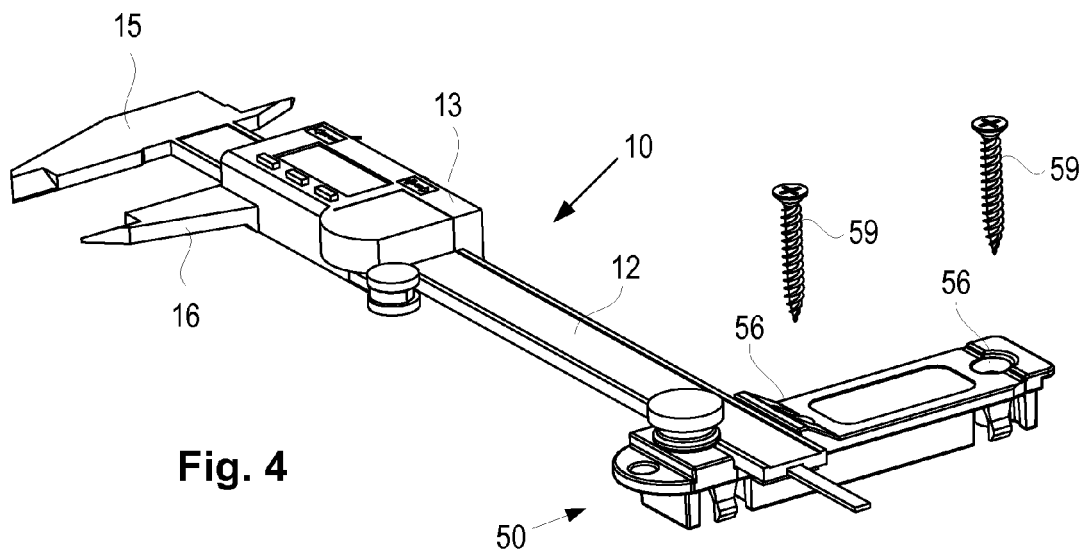
FIG. 4 is a perspective view of the caliper mounting apparatus of FIG. 1, having a conventional caliper mounted therein.
Figure 9:
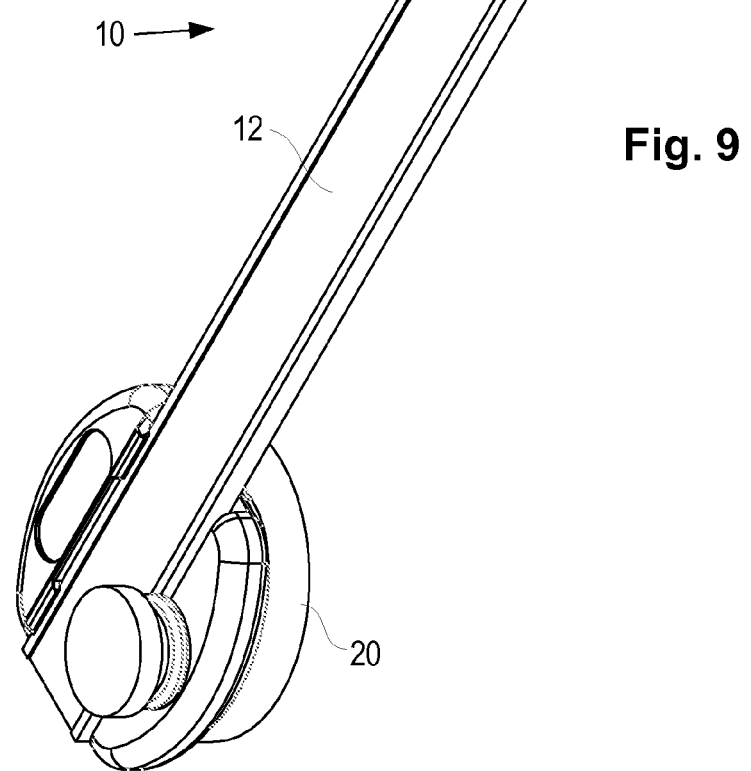
FIG. 9 is a perspective view of the caliper mounting apparatus of FIG. 5, having a conventional caliper mounted therein.
Figure 10:
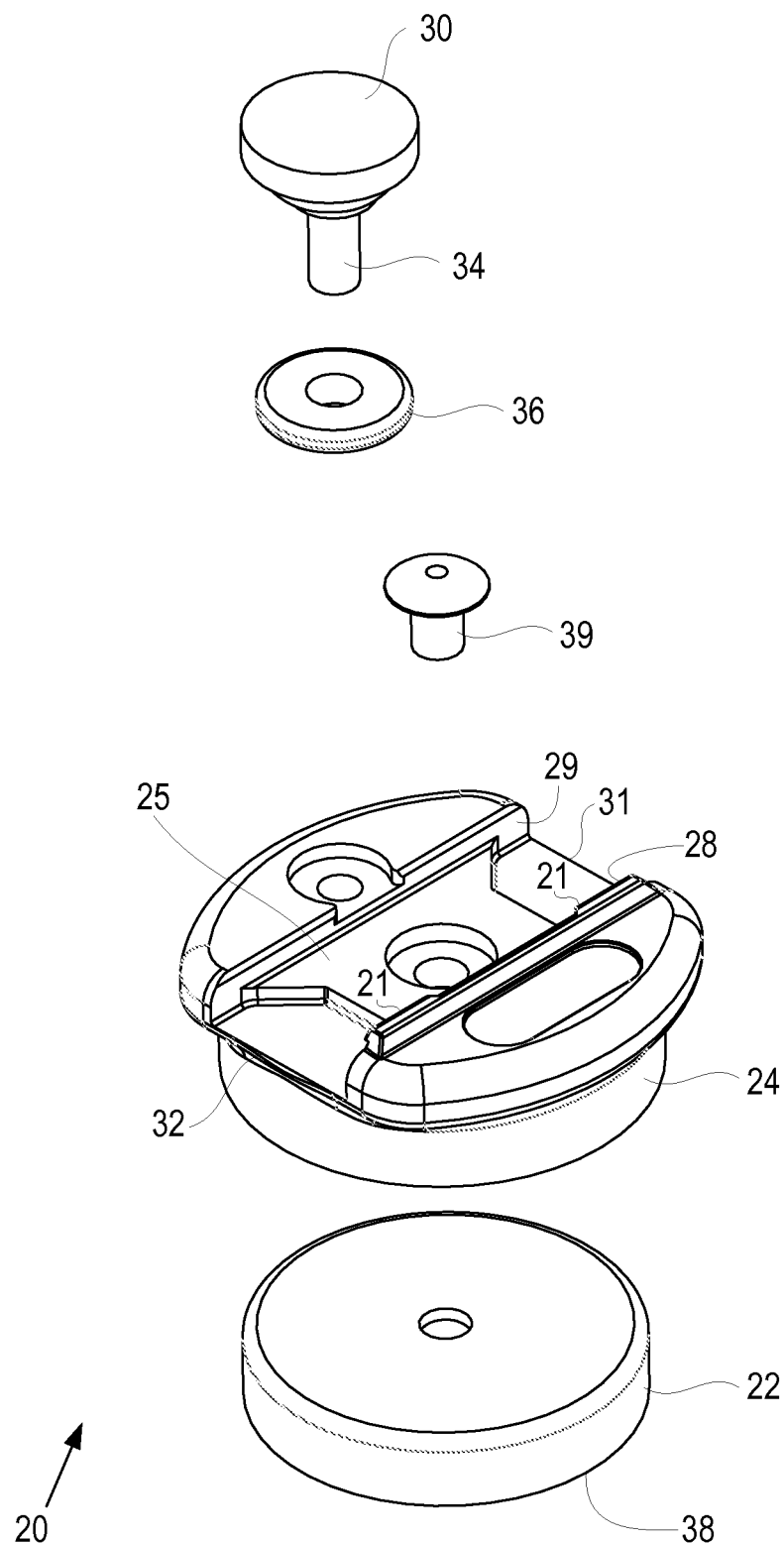
FIG. 10 is an exploded view diagram of the components used to assemble the caliper mounting apparatus of FIG. 5.

In both the top of the miter slot base 50 of FIGS. 1-4, and the top of the caliper mount 24 of FIGS. 5-10, a shallow primary channel 25 is provided for receiving the scale bar 12 of a sliding caliper 10. In FIGS. 1-4, the channel 25 extends, in a direction perpendicular to the length dimension 53 of the rectangular block 51, between opposite sides of the miter slot base 50. In FIGS. 5-10, the channel 25 extends between opposite edges 31 and 32 of the caliper mount 24. The channel 25 has a depth 27 of approximately 0.110 inches, which is slightly less than the standard thickness of the scale bar 12 of a conventional sliding caliper 10. The channel 25 has a width 26 of approximately 0.67 inches. In some embodiments, a shallow nested groove 35 extends longitudinally along and down the middle of the channel 25, to facilitate unhindered movement of the telescoping depth probe 14 of a sliding caliper 10 mounted on the caliper mount 24. The groove 35 preferably has a width of approximately one-quarter inch. FIG. 4 depicts a caliper 10 mounted within the channel 25 of the miter slot base 50. FIG. 9 depicts a caliper 10 mounted within the channel 25 of the magnetic caliper mounting apparatus 20.

In both the miter slot base 50 and the magnetic caliper mounting apparatus 20, one or more projections, such as shelf 21 or shelves 21, are cantilevered over a first side wall 28 of the channel 25. The shelf/shelves 21 enable the scale bar 12 of the caliper 10 to be releasably secured within the channel 25. A retainer or thumb screw 30 with a threaded shaft 34 is positioned adjacent a second side wall 29, opposite the first side wall 28, of the channel 25. The retainer 30 is adapted to releasably secure the scale bar 12 of the caliper 10 within the channel 25. The retainer 30 also includes a hold-down, such as a plastic or elastomeric stepped cone washer 36, to bias the scale bar 12 of the caliper 10 toward the first side wall 28 of the channel 25.

Figure 11:
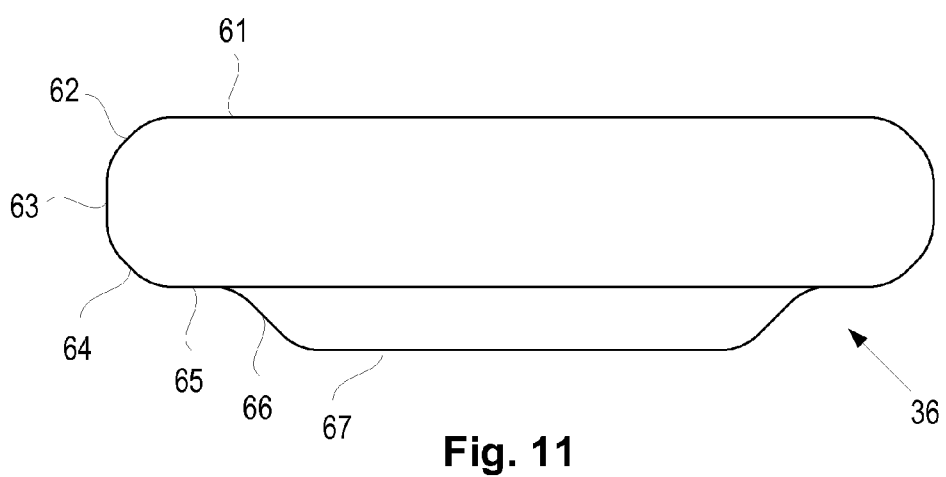
FIG. 11 is a side view of one embodiment of a stepped cone washer for use in the caliper mounting apparatus of FIG. 1.
Figure 5:
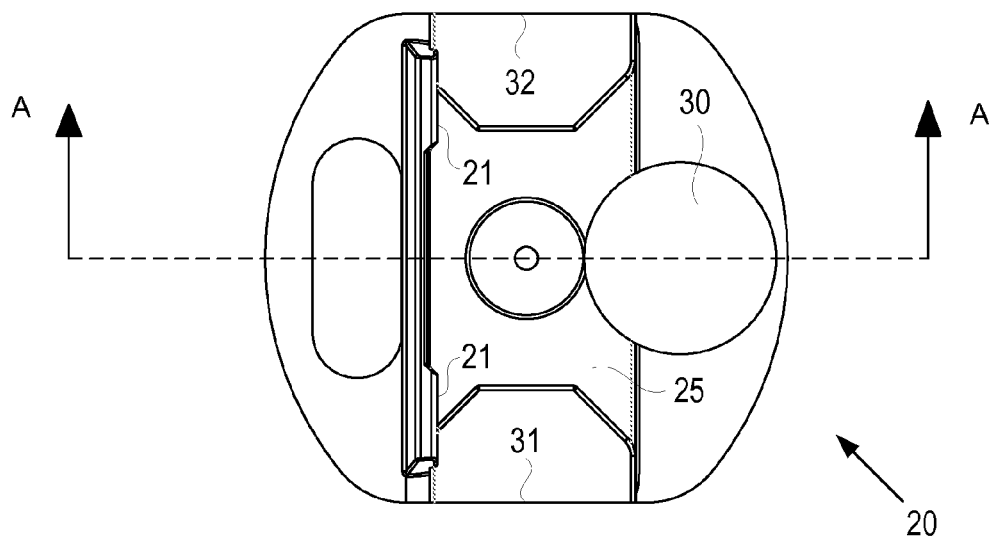
FIG. 5 is a top plan view of a magnetic caliper mounting apparatus.
Figure 6:
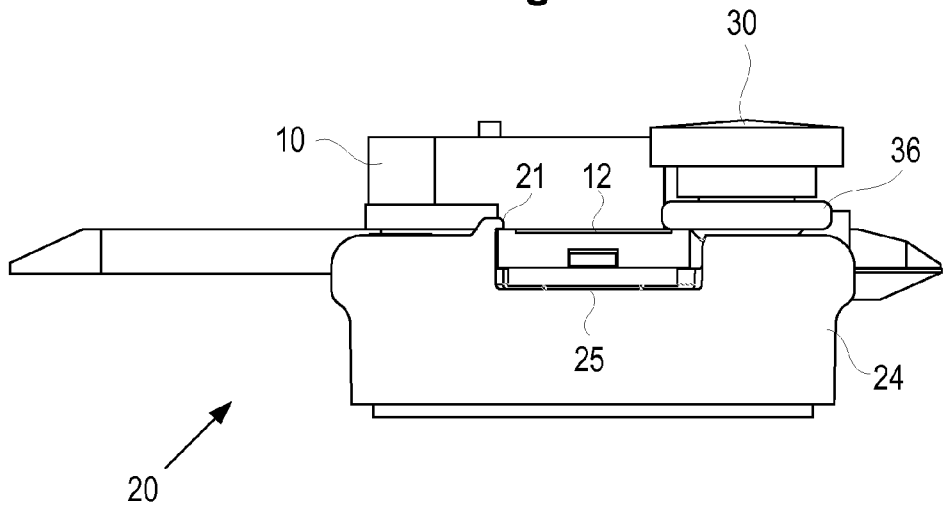
FIG. 6 is a side view of the caliper mounting apparatus of FIG. 5, with a caliper mounted therein.
Figure 7:
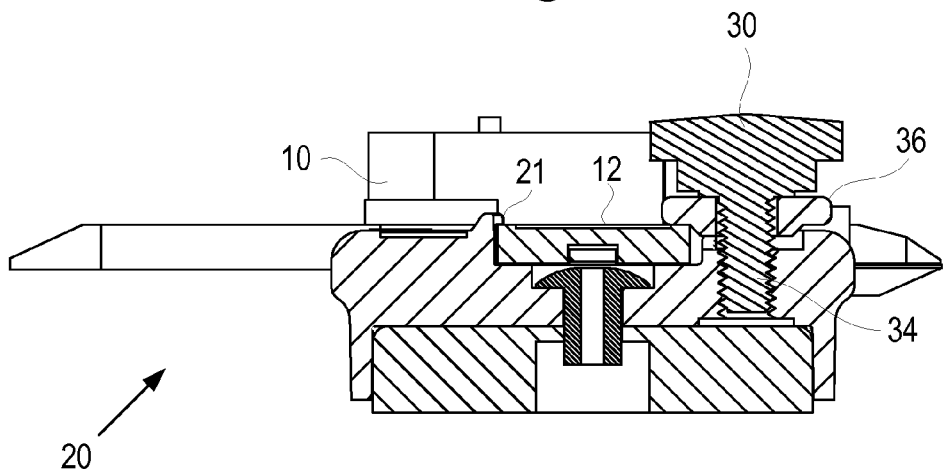
FIG. 7 is a cross-sectional view taken along line A-A of the caliper mounting apparatus of FIG. 5, but with a caliper mounted therein.
Figure 8:
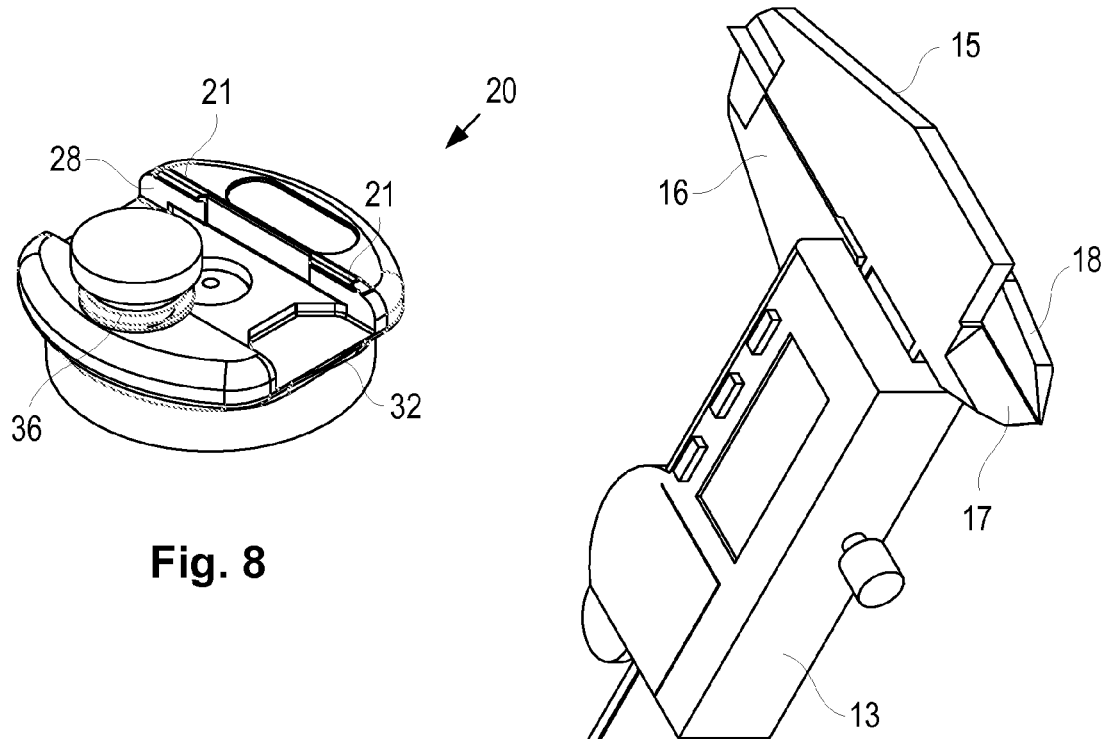
FIG. 8 is a perspective view of the caliper mounting apparatus of FIG. 5.

FIG. 11 illustrates one embodiment of a stepped cone washer 36 for use in the miter slot base 50 or magnetic caliper mounting apparatus 20. The washer 36 has a horizontal top section 61, a vertical cylindrical outer wall 63, a horizontal shoulder section 65, a frusto-conical section 66 located interiorly of the shoulder section 65, and a horizontal base section 67. The horizontal base section 67 is located interiorly of the frusto-conical section 66 and is vertically displaced below the shoulder section 65. Rounded or chamfered edges 62 and 64 may be provided between the top section 61, the outer wall 63, and the shoulder section 65.

To mount the sliding caliper 10 in the channel 25 of the miter slot base 50 or magnetic caliper mounting apparatus 20, the retainer 30 is loosened 1 to 1½ turns. The scale bar 12 of the caliper 10 is slid in, at an angle, underneath the washer 36. Next, the scale bar 12 is lowered into contact with the base of the channel 25. Then, the scale bar 12 is slid underneath the shelf or shelves 21. Next, the retainer 30 is tightened, causing the angled, frusto-conical section 66 of the washer 36 to bias the scale bar 12 toward the shelf side 28 of the channel 25. With the retainer urging the scale bar 12 of the caliper 10 toward the shelf side 28 of the channel 25, the channel 25 has an effective width, between the shelf side 28 and the frusto-conical section 66 of the washer 36, of approximately five-eighths of an inch.

To remove the sliding caliper 10, the retainer 30 is loosened 1 to 1½ turns. The scale bar 12 of the caliper 10 is slid over to the retainer side 29 of the channel 25, freeing the scale bar 12 from the shelf/shelves 21. The scale bar 12 is then tilted or pivoted upward and removed from the channel 25.

FIGS. 37A-39B of U.S. Pat. No. 7,735,237 depict various embodiments of a caliper kit, including a container and part bay for a caliper and a caliper mounting accessory. FIGS. 12-17 depict various improvements in a caliper container cover shell, modified so that the cover shell can be removed from the caliper container and used as a platform for mounting the caliper to a miter slot.

Figure 12:
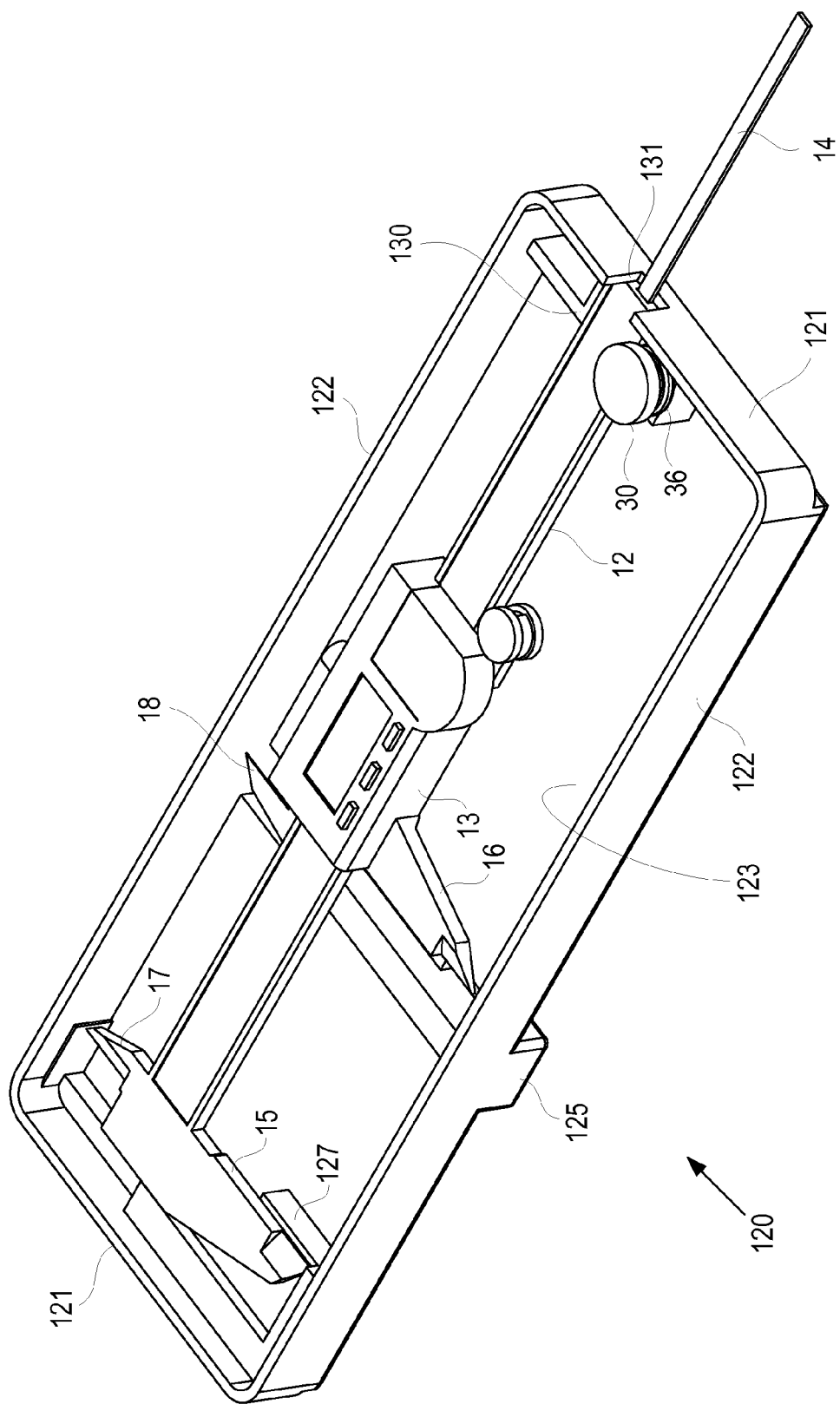
FIGS. 12 and 13 are perspective views of one embodiment of a cover shell for a sliding caliper container with a caliper mount provided in the shell and a table slot base integrally formed in the shell.
Figure 13:
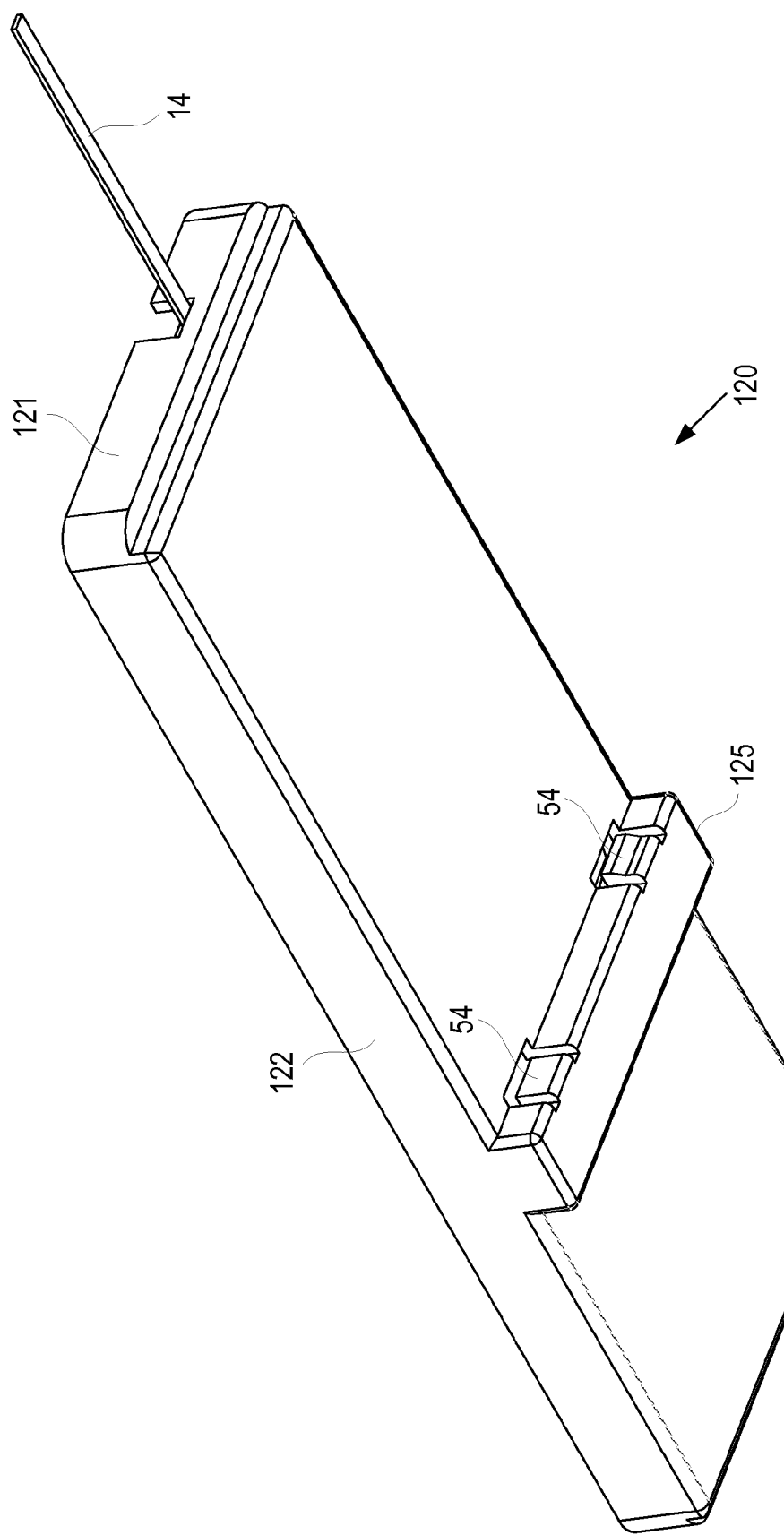

FIGS. 12 and 13 are perspective views of a first embodiment of a removable cover shell 120 for a sliding caliper container. A miter or table slot base 125 is integrally formed in the molding of the cover shell 120. The table slot base 125 projects out of the cover shell exterior and extends between opposite long sides 122 of the cover shell 120. The table slot base 125 is three-quarters of an inch wide and includes resilient compression projections or spring fingers 54 to removably secure the table slot base 125 within an elongated miter slot, thereby anchoring the cover shell 120 to a saw table or router table. When mounted, the cover shell 120 is oriented perpendicular to the miter slot.

A caliper mount 130 is formed in the cover shell 120, adjacent one of the short sides 121 of the cover shell 120. The caliper mount 130 includes a channel and retainer 30 and washer 36 disposed on one side of the channel for securing the scale bar 12 of a caliper 10 thereto. A caliper jaw rest 127 is provided adjacent the opposite short side 121 of the cover shell 120. The caliper jaw rest 127 supports the fixed outside jaw 15 of the caliper 10. The interior section 123 of the cover shell 120 is configured to allow the measurement readout frame 13, movable outside jaw 16, and movable inside jaw 18 to freely slide, without obstruction, along the length of the scale bar 12. An opening 131 in the short side 121 of the cover shell 120 adjacent the caliper mount 130 allows the depth probe 14 to telescope within the caliper scale bar 12.

Figure 14:
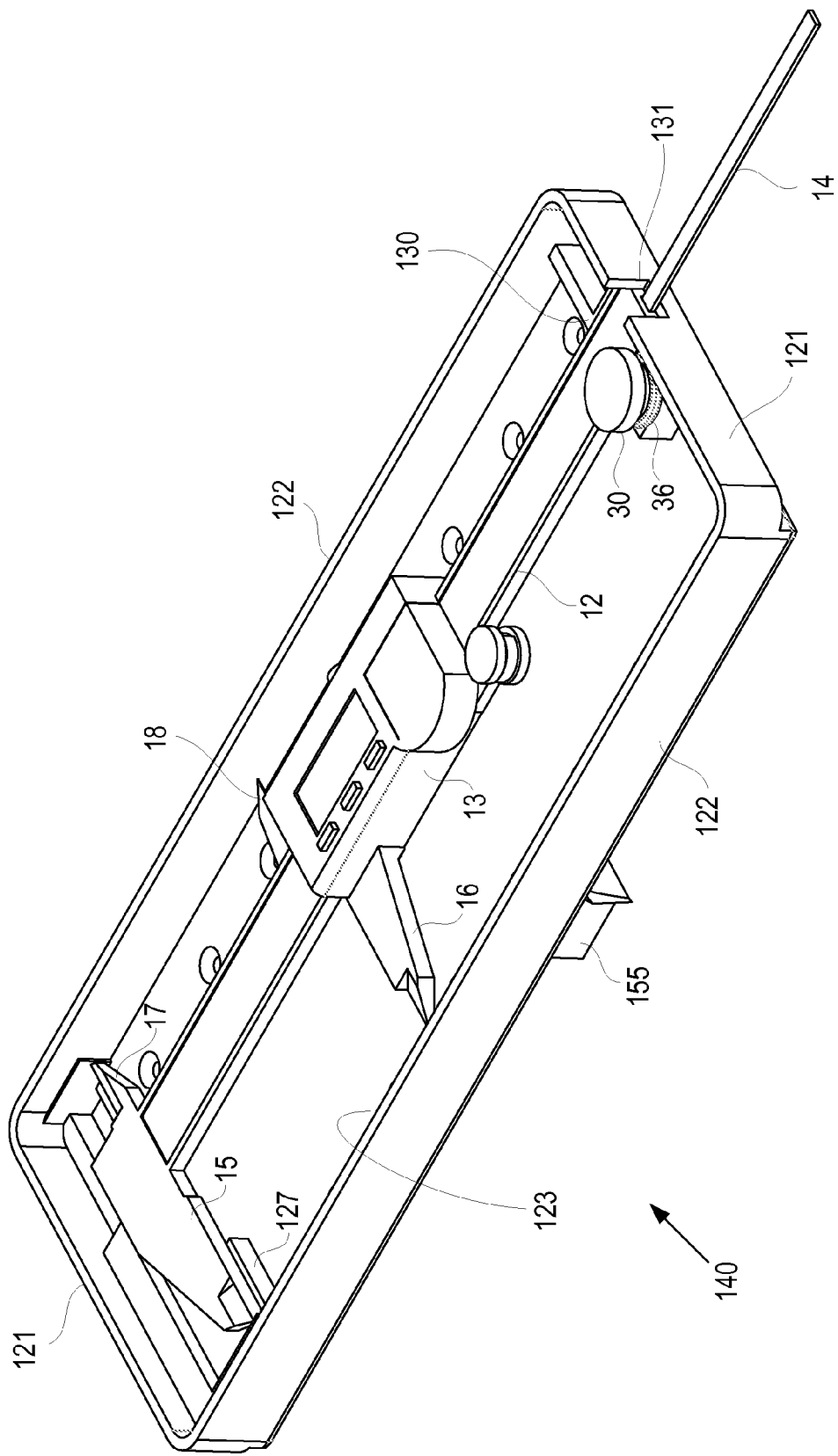
FIGS. 14 and 15 are perspective views of a second embodiment of a cover shell for a sliding caliper container, the cover shell having a plurality of compression fit receptacles for connecting a table slot base.
Figure 15:
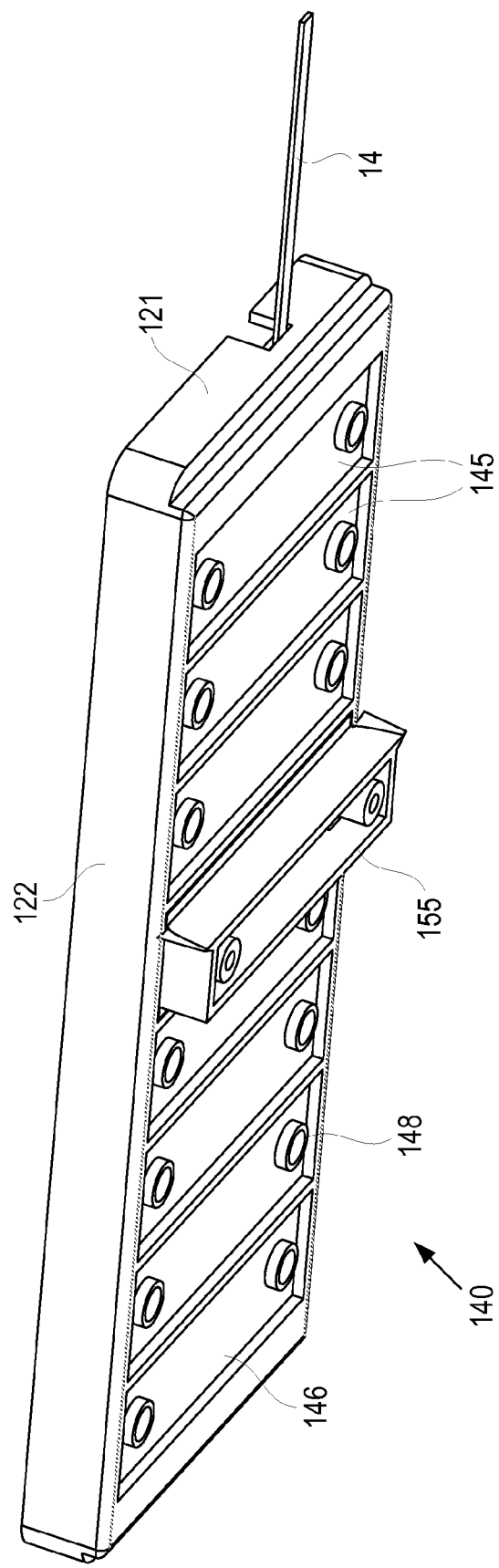

FIGS. 14 and 15 are perspective views of a second embodiment of a removable cover shell 140 for a sliding caliper container. Like the cover shell 120 of FIGS. 12-13, cover shell 140 of FIGS. 14-15 includes a caliper mount 130, caliper jaw rest 127, and an interior section 123 configured to allow the measurement readout frame 13 and movable jaws 16 and 18 of the caliper 10 to freely slide along the length of the scale bar 12. But unlike the cover shell 120, cover shell 140 does not include an integrally formed miter or table slot base 125. Rather, the shell cover shell 140 has a plurality of table slot mount connectors or receptacles 145 along the cover shell exterior, regularly spaced apart relative to the long sides 122 of the cover shell 140. A cooperating table or miter slot base 155 can be attached to any of the receptacles 145.

As shown in FIG. 15, the miter slot base 155 and cooperating receptacles 145 are configured to enable a Lego®-like connection of the miter slot base 155 to a receptacle 145. More particularly, each receptacle 145 comprises one or more round or polygonally-shaped hollow tubes 148 that project downwardly from a recessed surface 146 of the receptacle 145. The top of the miter slot base 155, which is obscured from view in FIG. 15, includes one or more raised studs (not shown) shaped for a compression fit with the hollow tubes 148 of the receptacle 145. In an alternative embodiment (not shown) the hollow tubes 148 and cooperating studs are reversed. That is, each receptacle 145 comprises one or more studs that project downwardly from the recessed surfaced 146 of the receptacle 145, and the miter slot base 155 is provided with hollow tubes 148 that cooperate with the studs for a compression fit.

Figure 16:
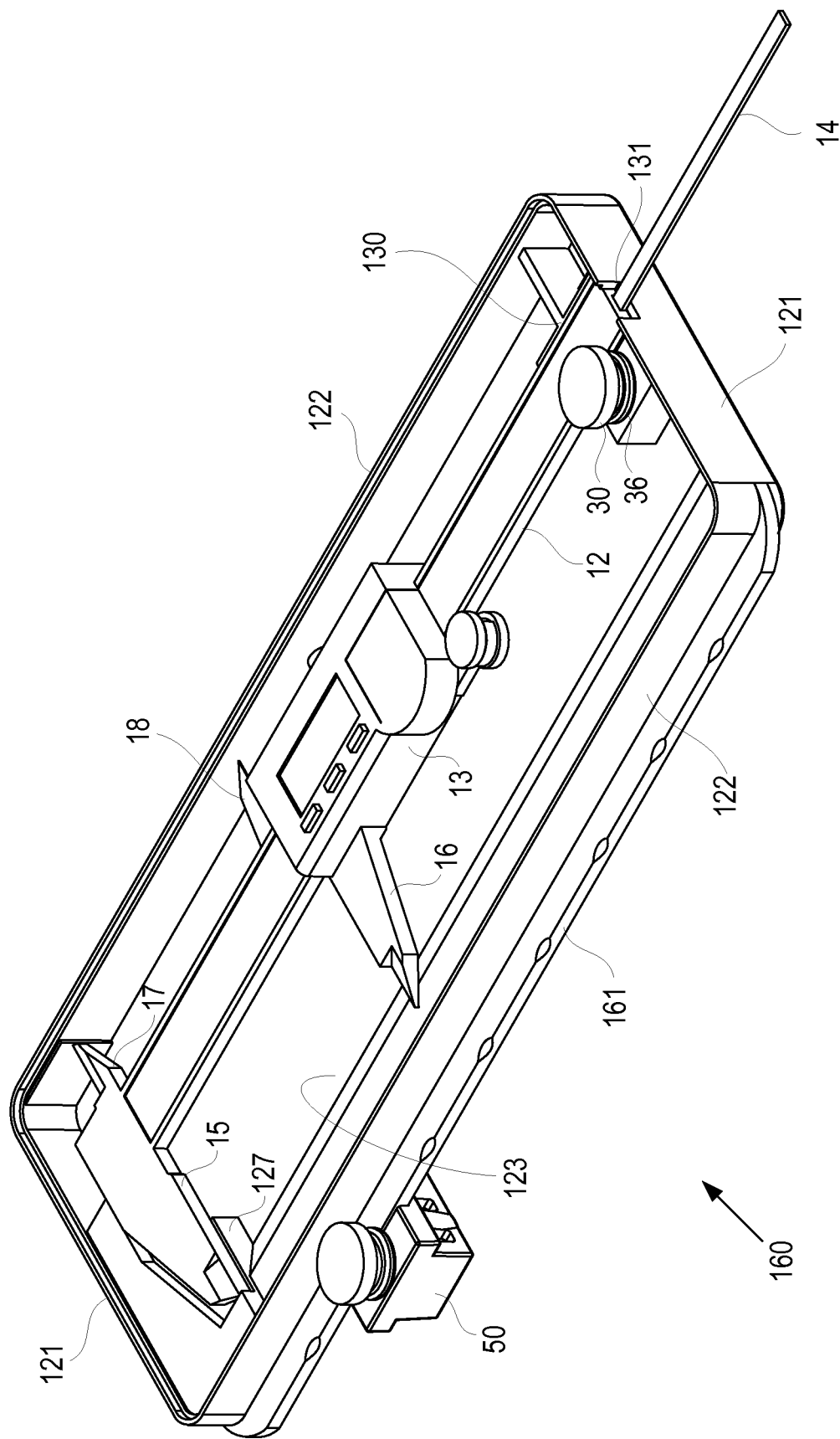
FIGS. 16 and 17 are perspective views of a third embodiment of a cover shell for a sliding caliper container, the cover shell having an elongated flange and a plurality of receptacles for mounting a table slot base.
Figure 17:
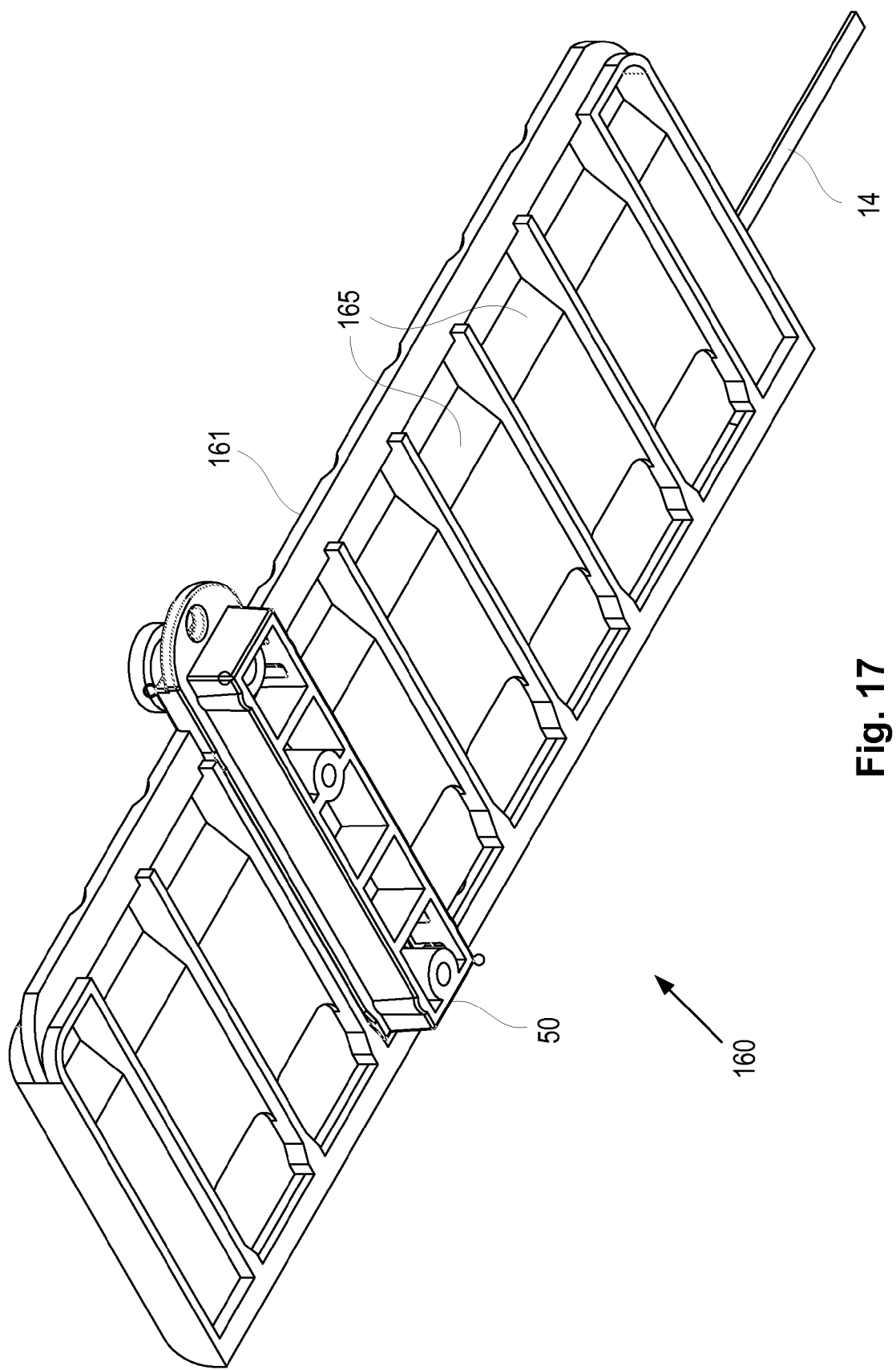

FIGS. 16 and 17 are perspective views of a third embodiment of a cover shell 160 for a sliding caliper container. Like the cover shell 140 of FIGS. 14-15, cover shell 160 of FIGS. 16-17 includes a caliper mount 130, caliper jaw rest 127, and an interior section 123 configured to allow the measurement readout frame 13 and movable jaws 16 and 18 of the caliper 10 to freely slide along the length of the scale bar 12. Also like the cover shell 140, cover shell 160 lacks an integrally formed miter or table slot base 125.

The cover shell 160 also includes a plurality of recessed table slot mount connectors or receptacles 165 along the cover shell exterior, regularly spaced apart relative to the long sides 122 of the cover shell 160. The receptacles 165 are shaped to receive the miter slot base 50 of FIGS. 1-4. An elongated flange or shelf 161 is provided along one of the long sides 122 of the cover shell 160 on which to mount the miter slot base 50. The shelf 161 is dimensioned with approximately the same width (five-eighths of an inch) and thickness (one-eighth of an inch) as the scale bar 12 of a conventional caliper 10, for mounting within the channel 25 of the miter slot base 50.

A miter slot base 50 can be attached to any of the receptacles 165 of the cover shell 160. Next, the miter slot base 50 can be inserted into the miter slot of a saw or router table, anchoring the cover shell 160 thereto. With a conventional caliper 10 mounted in the caliper mount 130 of the cover shell 160, the cover shell 160 serves as an accessory for mounting the caliper 10 perpendicular to the miter slot of a saw or router table.

As one of ordinary skill in the art will appreciate, the cover shells 120, 140 and 160 are also suitable as stand-alone caliper-mounting platforms. That is, the cover shells 120, 140 and 160 need not be used or referred to as a "cover shell" for a caliper container. They are suitable for sale and use as stand-alone caliper mounting accessories.

Figure 18:
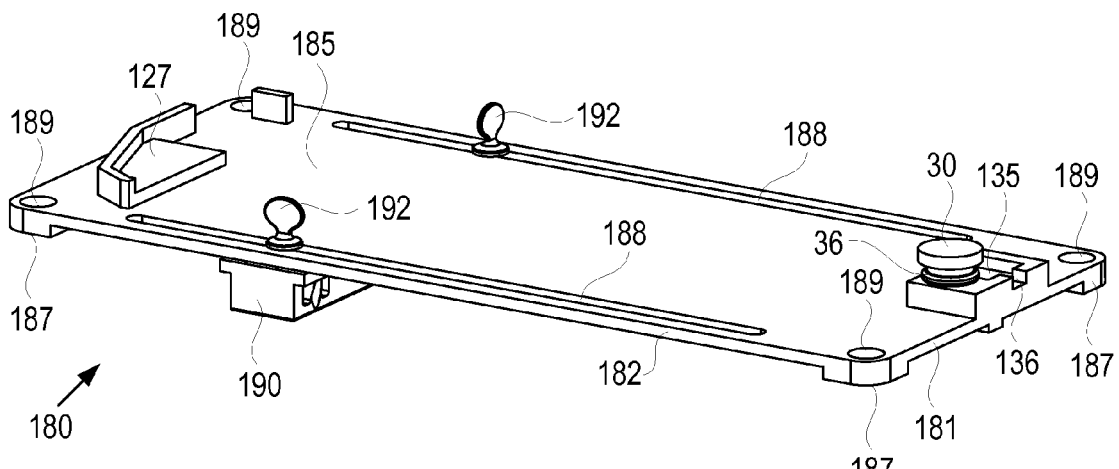
FIG. 18 is a perspective view of an embodiment of a stand-alone caliper accessory with parallel slots for mounting a miter slot base.
Figure 19:
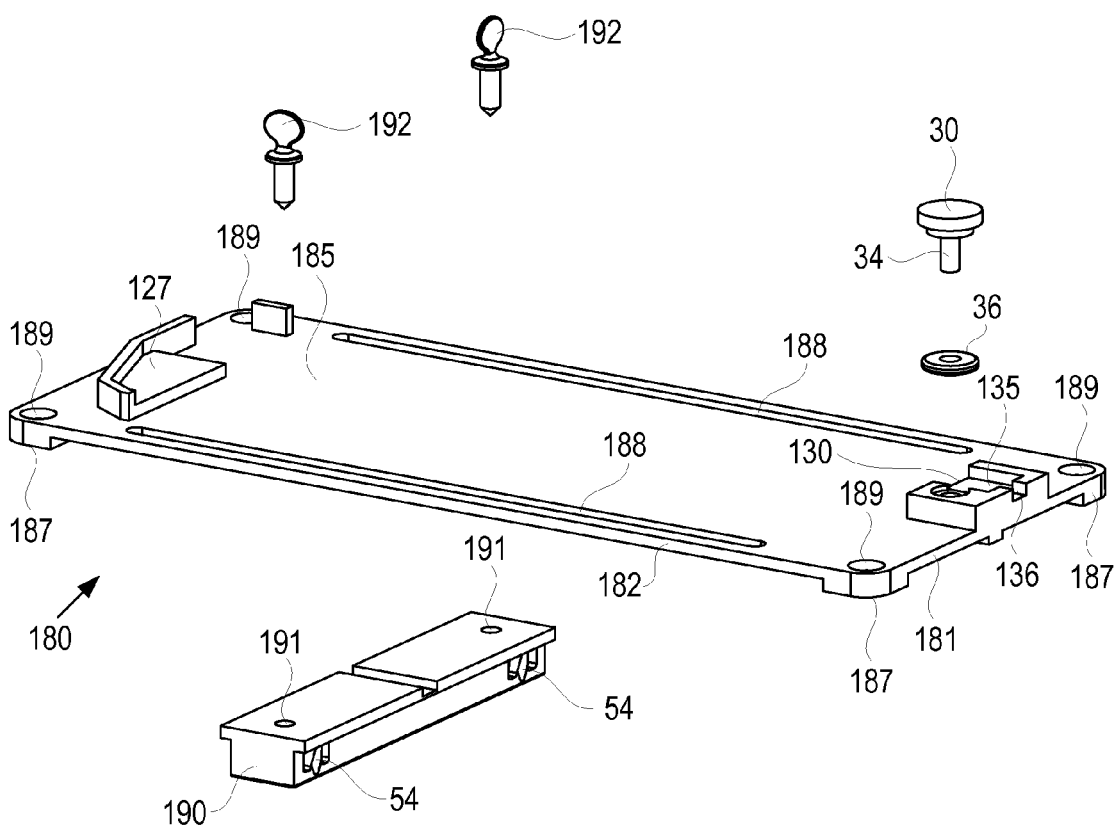
FIG. 19 is an exploded view diagram of the caliper accessory of FIG. 18.
Figure 20:
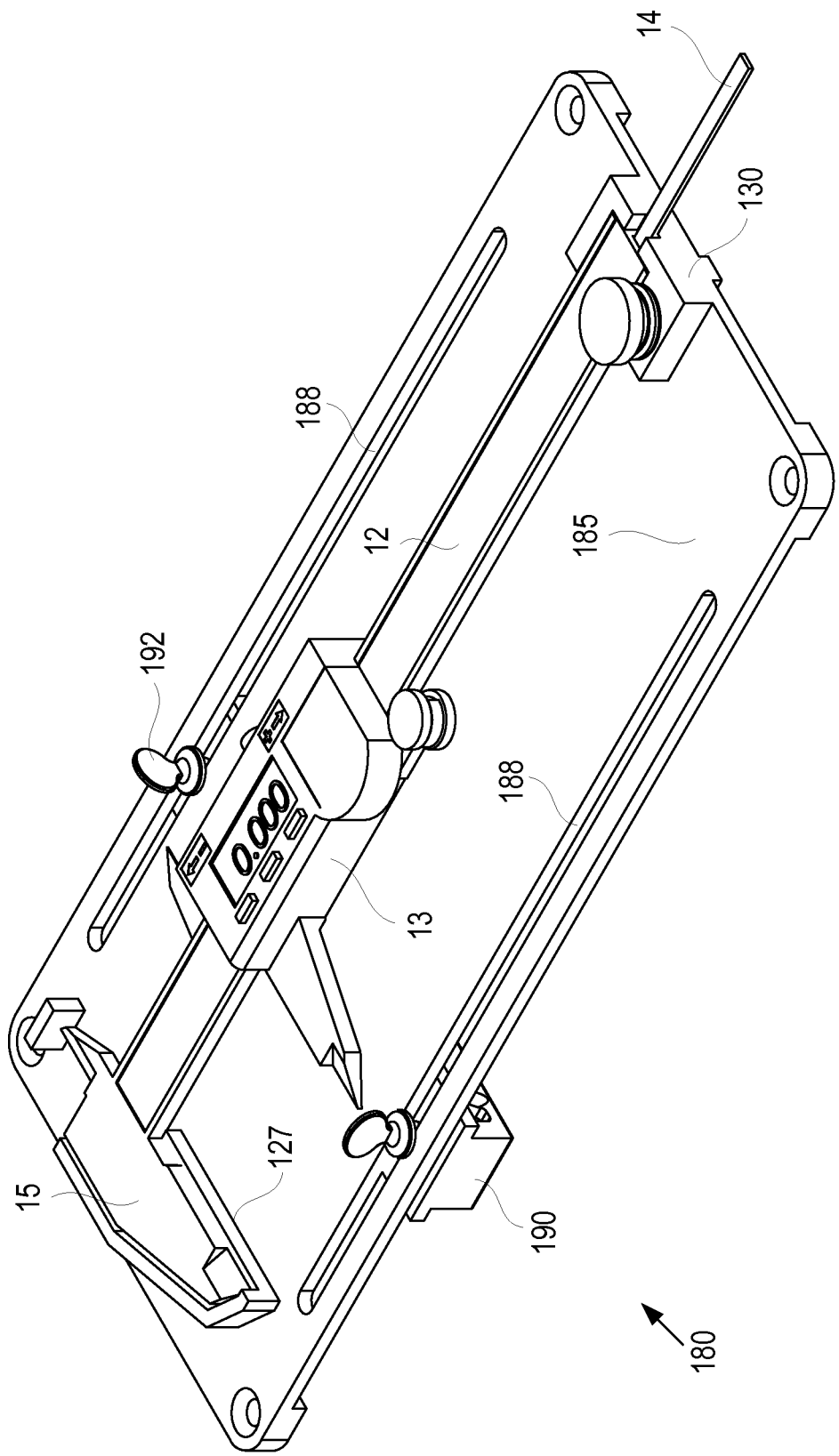
FIG. 20 is a perspective view of the stand-alone caliper accessory of FIG. 18, with a caliper mounted therein.

FIGS. 18-20 depict another embodiment of a stand-alone caliper mounting accessory 180. The accessory 180 comprises a substantially planar platform 185 with two elongated slots 188 running adjacent and parallel to the long sides 182 of the platform 180. The accessory 180 also comprises a table or miter slot base 190 approximately three-quarters of an inch wide with resilient compression projections or spring fingers 54 for inserting the miter slot base 190 into the miter slot of a saw or router table. Interiorly threaded holes 191 are provided for receiving two flanged thumb screws 192. The miter slot base 190 may be secured to the platform 185 at any desired position along the length of the slots 188 by inserting the thumb screws 192 through slots 188, screwing them into holes 191 of the miter slot base 190, and tightening.

A raised caliper mount 130 is provided on the platform 180 adjacent one of the short sides 181 of the platform 180. A caliper jaw rest 127 is provided adjacent the opposite short side 181 of the platform 180. The caliper mount 130, which is either attached to or integrally formed and molded with the platform 180, comprises a truncated channel 135 for receiving the end of the scale bar 12 of a conventional caliper 10, a nested opening 136 to allow passage and telescoping movement of the depth probe 14, a washer 36, and a retainer 30. As shown in FIG. 20, the caliper jaw rest 127 and caliper mount 130 are spaced apart to enable a conventional caliper 10 to be securely mounted thereon. Each corner of the platform 180 is also provided with short, downwardly extending spacing stubs 187 having screw holes 189 for securing the platform 180 to a board or other fixture.

It will be observed that both the cover shells 120, 140 and 160, and platform 180 of FIGS. 12-20 have length and width dimensions greater than the respective length and width dimensions of a fully collapsed conventional caliper 10. Stated another way, the length of the cover shells 120, 140 and 160, and platform 180 exceeds the length of the scale bar 12 of the caliper 10; and the width of the cover shells 120, 140 and 160, and platform 180 exceeds the combined width of the fixed outside and inside jaws 15 and 17 of the caliper 10. This dimensional configuration enables the cover shells 120, 140 and 160, and platform 180 to at least partially shield and protect the caliper 10 from damaging collisions with tools, workpieces, and equipment.

FIG. 21 is a perspective view of a sliding caliper kit including a container housing 210, a sliding caliper 10, a miter slot base 50, and a magnetic caliper mounting apparatus 20. The container housing 210 comprises a bottom shell 211 and a cover shell 160 configured as described above in connection with FIG. 16. Included or placed within the bottom shell 211 is a molded parts bay 212. The parts bay 212 comprises a first recess shaped to seat a fully collapsed sliding caliper 10, a second recess shaped to seat a miter slot base 50, and a third recess shaped to seat a magnetic caliper mounting apparatus 20. The bottom shell 211 and cover shell 160 are molded for a compression fit to each other, so that they can be removed from each other. In an alternative embodiment (not shown), the bottom shell 211 and cover shell 160 are hingedly removably jointed to each other.

The foregoing merely describes some of the features of the present invention. Other features are apparent from review of the accompanying figures. It should be noted that the disclosures contained in this specification and the accompanying figures are exemplary only, and that various other alternatives, adaptations, and modifications may be made within the scope of the present invention. For example, the retainer or thumb screw 30 may be replaced with other retainers illustrated in U.S. Pat. No. 7,735,237, which is incorporated by reference. Moreover, the improvements in this application relating to the use of a stepped cone washer and cantilevered projections to more securely retain a caliper scale bar within a mounting channel can be applied to any of the caliper mounts depicted or described in U.S. Pat. No. 7,735,237, as well as to other caliper mounts. Accordingly, the present invention is not limited to the specific embodiments illustrated herein.

I claim:

1. An apparatus for mounting a sliding caliper having a movable frame with a measurement readout mounted for sliding along a scale bar, the apparatus comprising:
   a caliper mount adapted for mounting the sliding caliper;
   the caliper mount having a shallow channel for receiving the scale bar of the caliper, the channel having a width slightly greater than the width of the scale bar;
   one or more projections cantilevered over a first side of the channel, the one or more projections being adapted to releasably secure the scale bar of the caliper within the channel of the caliper mount; and
   a retainer positioned on a second side of the channel, opposite the first side of the channel, adapted to releasably secure the scale bar of the caliper within the channel of the caliper mount and bias the scale bar of the caliper toward the first side of the channel;
   wherein the channel has an effective width of approximately five-eighths of an inch when the retainer is positioned to bias the scale bar of the caliper toward the first side of the channel.

2. The apparatus of claim 1, further comprising a slot insertion section approximately three-quarters of an inch wide adapted for a snug insertion fit into an elongated slot of a saw or router table.

3. The apparatus of claim 1, wherein the retainer includes a hold-down with an angled edge for biasing the scale bar of the caliper toward the first side of the channel.

4. The apparatus of claim 1, wherein the retainer includes a washer with a shoulder section and an angled section located interiorly of the shoulder section, the angled section being adapted for biasing the scale bar of the caliper toward the first side of the channel, and the shoulder section being adapted for pressing down and securely holding the scale bar in the channel.

5. The apparatus of claim 1, further comprising a magnet associated with the caliper mount and having a flat exposed surface operable to secure the apparatus to a planar metal surface.

6. A miter slot mount for a sliding caliper having a readout frame slidably mounted on a scale bar, the miter slot mount being adapted to releasably anchor the sliding caliper to a miter slot of a saw or router table, the miter slot mount comprising:
   a slot insertion section approximately three-quarters of an inch wide adapted for a snug insertion fit into the miter slot;
   a shallow channel for receiving the scale bar of the caliper, the channel having a width slightly greater than the width of the scale bar; and
   a retainer adapted to releasably secure the scale bar of the caliper within the channel of the caliper mount.

7. The miter slot mount of claim 6, further comprising resilient compression projections along a side of the slot insertion section adapted to provide a snug fit of the miter slot mount within the miter slot.

8. The miter slot mount of claim 6, wherein the retainer is positioned along one side of the channel, the miter slot mount further comprising one or more projections cantilevered over an opposite side of the channel, the one or more projections cooperating with the retainer to retain the caliper scale bar in the channel.

9. The table slot mount of claim 6, wherein the retainer includes a hold-down with an angled edge configured to bias the scale bar of the caliper underneath the cantilevered projections.

10. The table slot mount of claim 9, wherein the hold-down comprises an elastomeric or plastic cone washer.

11. A mounting apparatus for a sliding caliper having a readout frame slidably mounted on a scale bar, the mounting apparatus comprising:
   a platform adapted to secure the sliding caliper;
   the platform being configured to allow free movement of the readout frame along the scale bar while the sliding caliper is secured on the platform; and
   a table slot base adapted to secure the platform to an elongated slot approximately three-quarters of an inch wide.

12. The mounting apparatus of claim 11, wherein the platform forms part of a removable first shell, the mounting apparatus further comprising a second shell, the first and second shells being configured to join together to form a container to house and store the caliper.

13. The mounting apparatus of claim 11, further comprising a caliper mount on the platform, the caliper mount comprising:
   a truncated channel for receiving and securing an end of the scale bar of the caliper;
   a retainer adapted to releasably secure the end of the scale bar of the caliper within the truncated channel;
   an opening to allow a depth probe of the caliper to telescope between extended and retracted positions when the scale bar of the caliper is secured to the caliper mount.

14. The mounting apparatus of claim 11, wherein the table slot base and platform are adapted for interconnection along a selectable location of the platform.

15. The mounting apparatus of claim 14, wherein a plurality of regularly spaced apart table slot mount receptacles are formed in the platform for connecting the platform to the table slot base at a selectable location along the platform.

16. The mounting apparatus of claim 15, wherein the table slot base comprises:
   a shallow channel for receiving the scale bar of the caliper, the channel having a width slightly greater than the width of the scale bar; and
   a retainer adapted to releasably secure the scale bar of the caliper within the channel of the table slot base;
   wherein the table slot base is adapted to mount not only the platform to the elongated slot, but also the sliding caliper without the platform to the elongated slot.

17. The mounting apparatus of claim 16, further comprising a flange extending out from a long side of the platform, the flange being configured to seat the platform within the channel of the table slot base.

18. The mounting apparatus of claim 11, further comprising resilient compression projections along a side of the table slot base, the resilient compression projections adapting the table slot base for a snug insertion fit into the elongated slot.

19. The mounting apparatus of claim 11, wherein the table slot base is adapted to anchor the platform in an orientation perpendicular to the elongated slot.

20. A sliding caliper kit comprising:
   a sliding caliper having a readout frame slidably mounted on a scale bar; and
   a container for the sliding caliper, the container being adapted to be mounted within an elongated slot of a saw or router table and thereby functionally enhance the sliding caliper, the container including a housing defining an interior section adapted to receive and protect the sliding caliper within the interior section; and
   a table slot mount adapted to releasably anchor at least a portion of the container to an elongated slot approximately three-quarters of an inch wide.

* * * * *